(12) United States Patent
Durham

(10) Patent No.: US 10,624,521 B2
(45) Date of Patent: Apr. 21, 2020

(54) DISHWASHER APPLIANCE CONFIGURED FOR FLOOD AND LEAK DETECTION

(71) Applicant: Haier US Appliance Solutions, Inc., Wilmington, DE (US)

(72) Inventor: Kyle Edward Durham, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 193 days.

(21) Appl. No.: 15/834,207

(22) Filed: Dec. 7, 2017

(65) Prior Publication Data

US 2019/0174990 A1 Jun. 13, 2019

(51) Int. Cl.
| | | |
|---|---|---|
| *A47L 15/42* | (2006.01) | |
| *A47L 15/50* | (2006.01) | |
| *A47L 15/16* | (2006.01) | |
| *A47L 15/23* | (2006.01) | |
| *A47L 15/46* | (2006.01) | |
| *G05B 15/02* | (2006.01) | |

(52) U.S. Cl.
CPC ........... *A47L 15/4212* (2013.01); *A47L 15/16* (2013.01); *A47L 15/23* (2013.01); *A47L 15/4221* (2013.01); *A47L 15/4223* (2013.01); *A47L 15/4244* (2013.01); *A47L 15/4259* (2013.01); *A47L 15/46* (2013.01); *A47L 15/507* (2013.01); *G05B 15/02* (2013.01); *A47L 2401/08* (2013.01); *A47L 2401/09* (2013.01); *A47L 2401/14* (2013.01); *A47L 2401/34* (2013.01); *A47L 2501/01* (2013.01); *A47L 2501/05* (2013.01); *A47L 2501/26* (2013.01); *A47L 2501/36* (2013.01)

(58) Field of Classification Search
CPC ...... A47L 15/4212; A47L 15/16; A47L 15/23; A47L 15/4221; A47L 15/4223; A47L 15/4244; A47L 15/4259; A47L 15/46; A47L 15/507; A47L 2401/08; A47L 2401/09; A47L 2401/14; A47L 2401/34; A47L 2501/01; A47L 2501/05; A47L 2501/26; A47L 2501/36; G05B 15/02
See application file for complete search history.

(56) References Cited

U.S. PATENT DOCUMENTS

| | | | |
|---|---|---|---|
| 7,032,434 B2 | 4/2006 | Lee et al. | |
| 9,565,987 B2 | 2/2017 | Poyner et al. | |
| 2009/0266442 A1* | 10/2009 | Duscher | G01F 23/243 |
| | | | 141/95 |

(Continued)

FOREIGN PATENT DOCUMENTS

| | | |
|---|---|---|
| CN | 100588362 C | 2/2010 |
| DE | 10246016 A1 | 4/2004 |

OTHER PUBLICATIONS

Jack G. Ganssle, "A Guide to Debouncing" 2007, retrieved on Sep. 17, 2019 from https://cseweb.ucsd.edu/classes/sp07/cse140L/debounce.pdf (Year: 2007).*

*Primary Examiner* — Thomas C Lee
*Assistant Examiner* — Michael Tang
(74) *Attorney, Agent, or Firm* — Dority & Manning, P.A.

(57) ABSTRACT

A dishwasher appliance that includes features for prevention and detection of flood events and leaks without sacrificing performance or efficiency of the dishwasher appliance is provided. Moreover, methods for detecting and preventing such flood events and leaks are also provided.

19 Claims, 7 Drawing Sheets

(56) References Cited

U.S. PATENT DOCUMENTS

| | | | |
|---|---|---|---|
| 2011/0056520 A1* | 3/2011 | Varacins | A47L 15/0049 134/18 |
| 2013/0008477 A1 | 1/2013 | Forst et al. | |
| 2015/0020887 A1* | 1/2015 | Poyner | A47L 15/0049 137/1 |

* cited by examiner

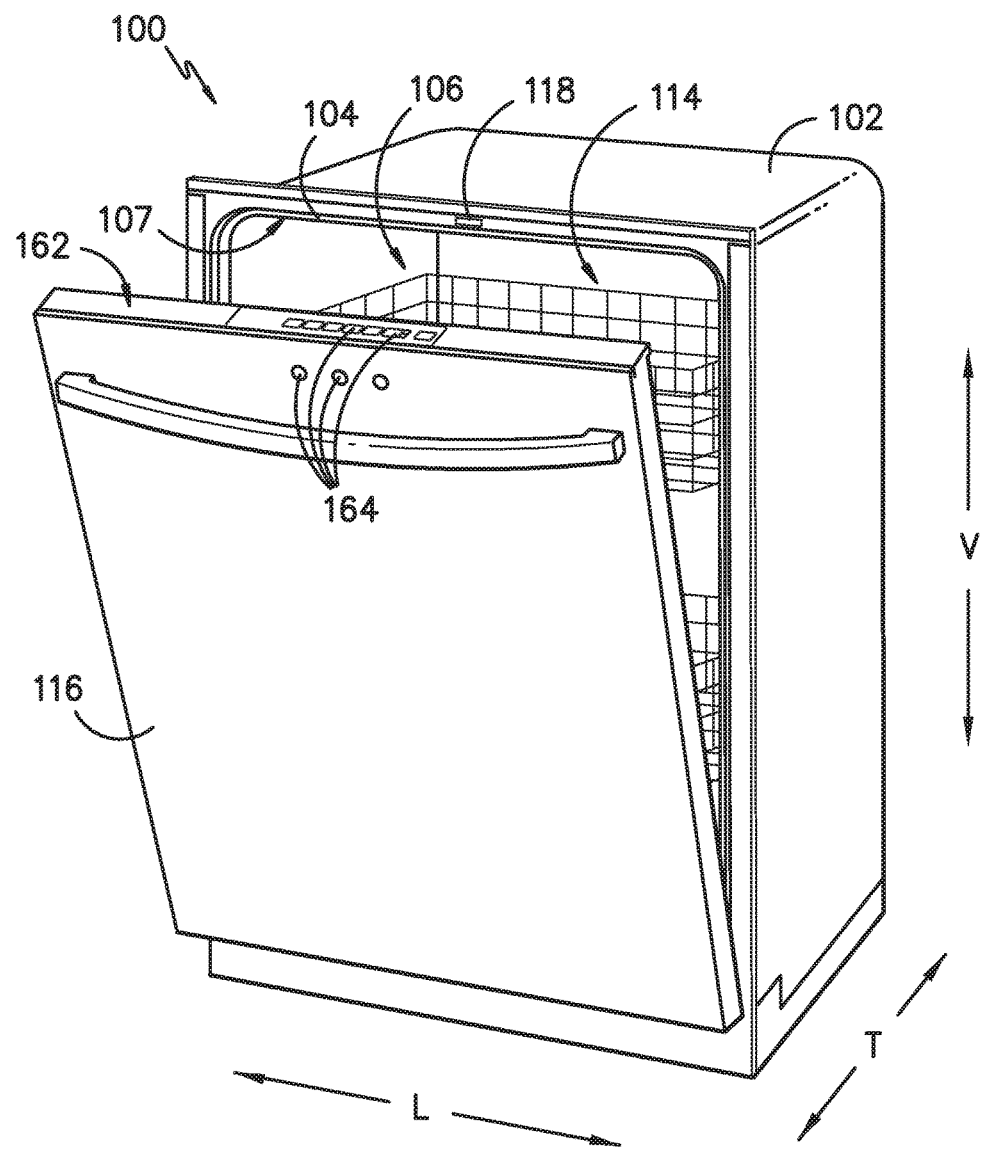
FIG. -1-

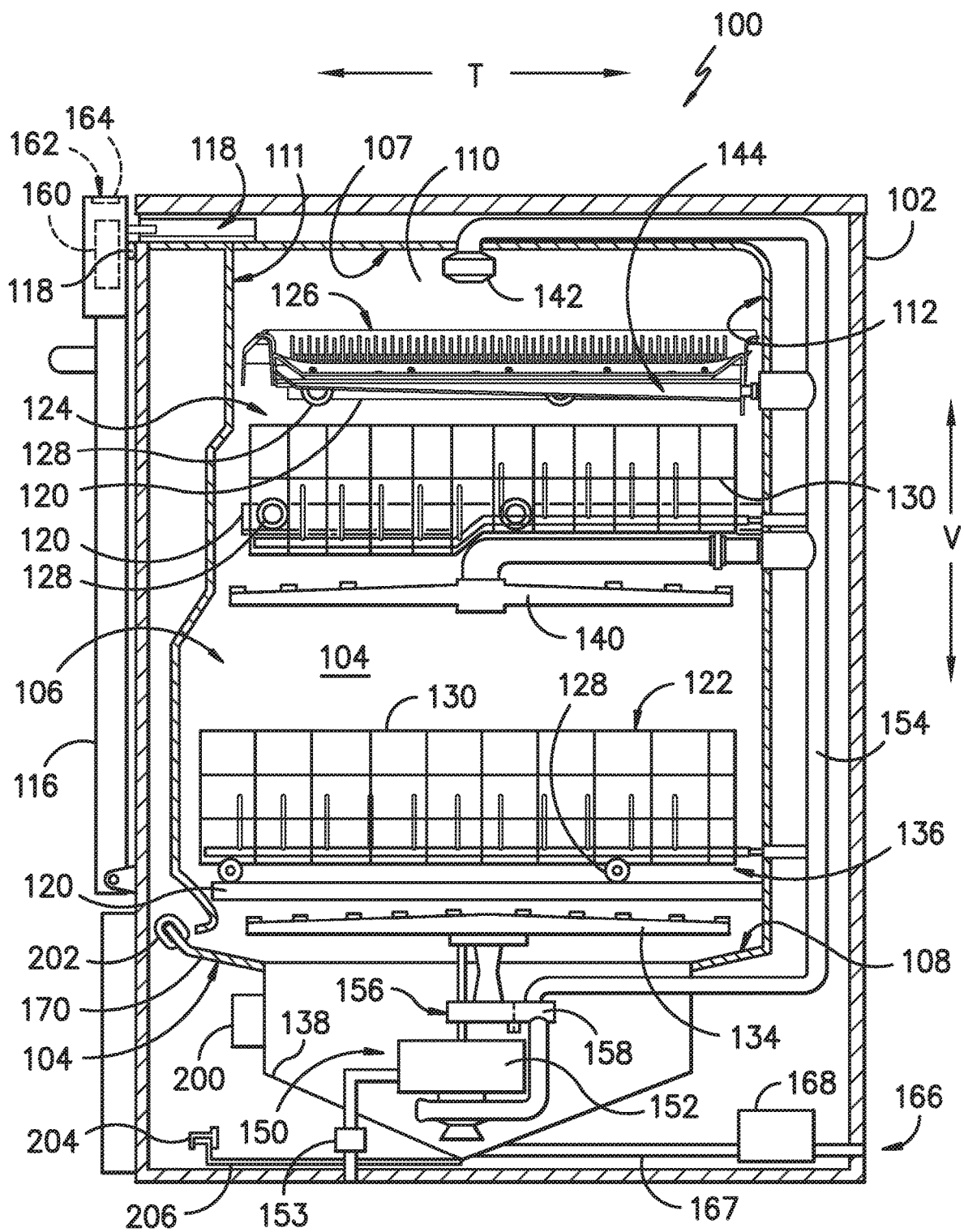
FIG. -2-

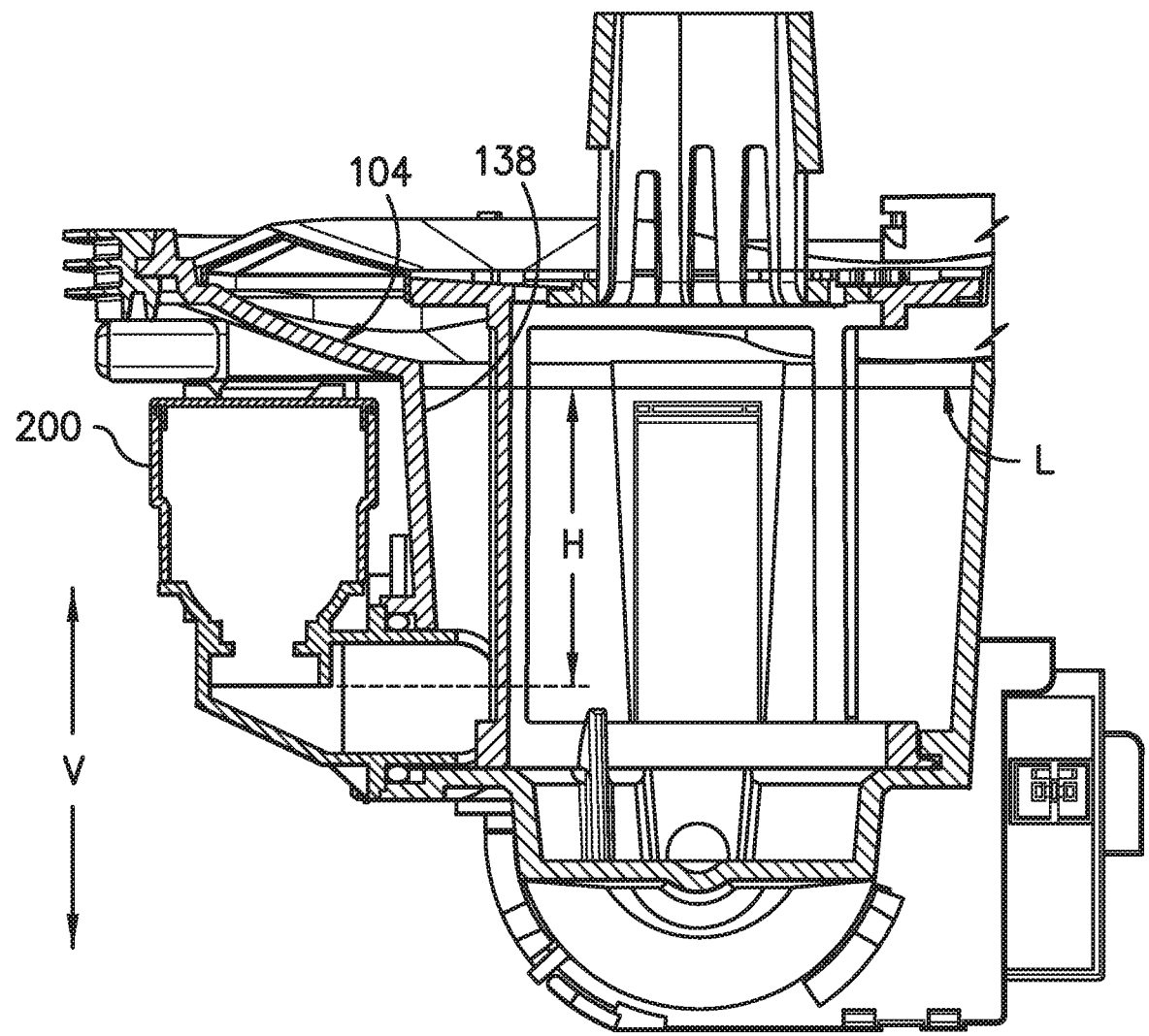
FIG. -3-

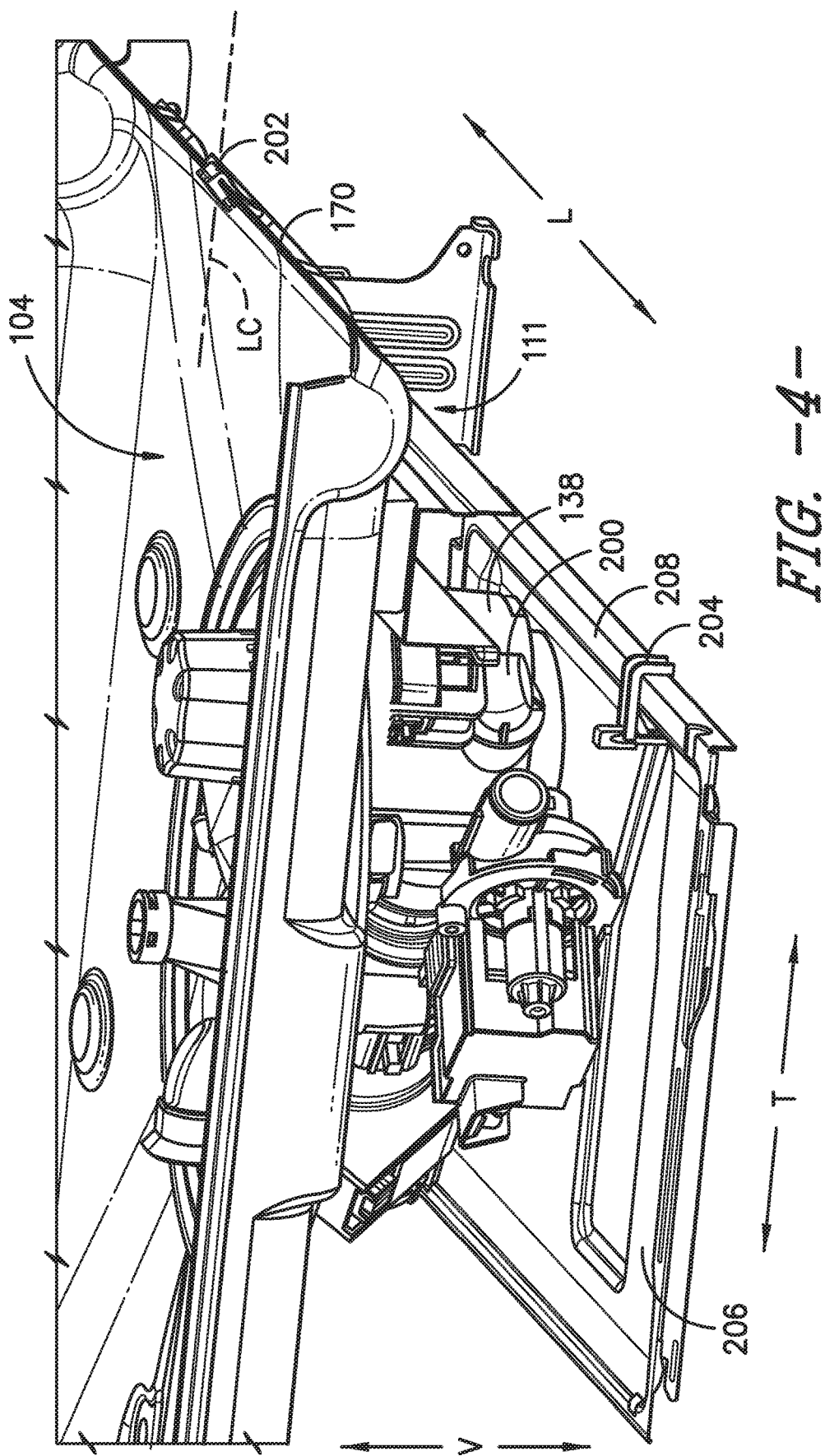

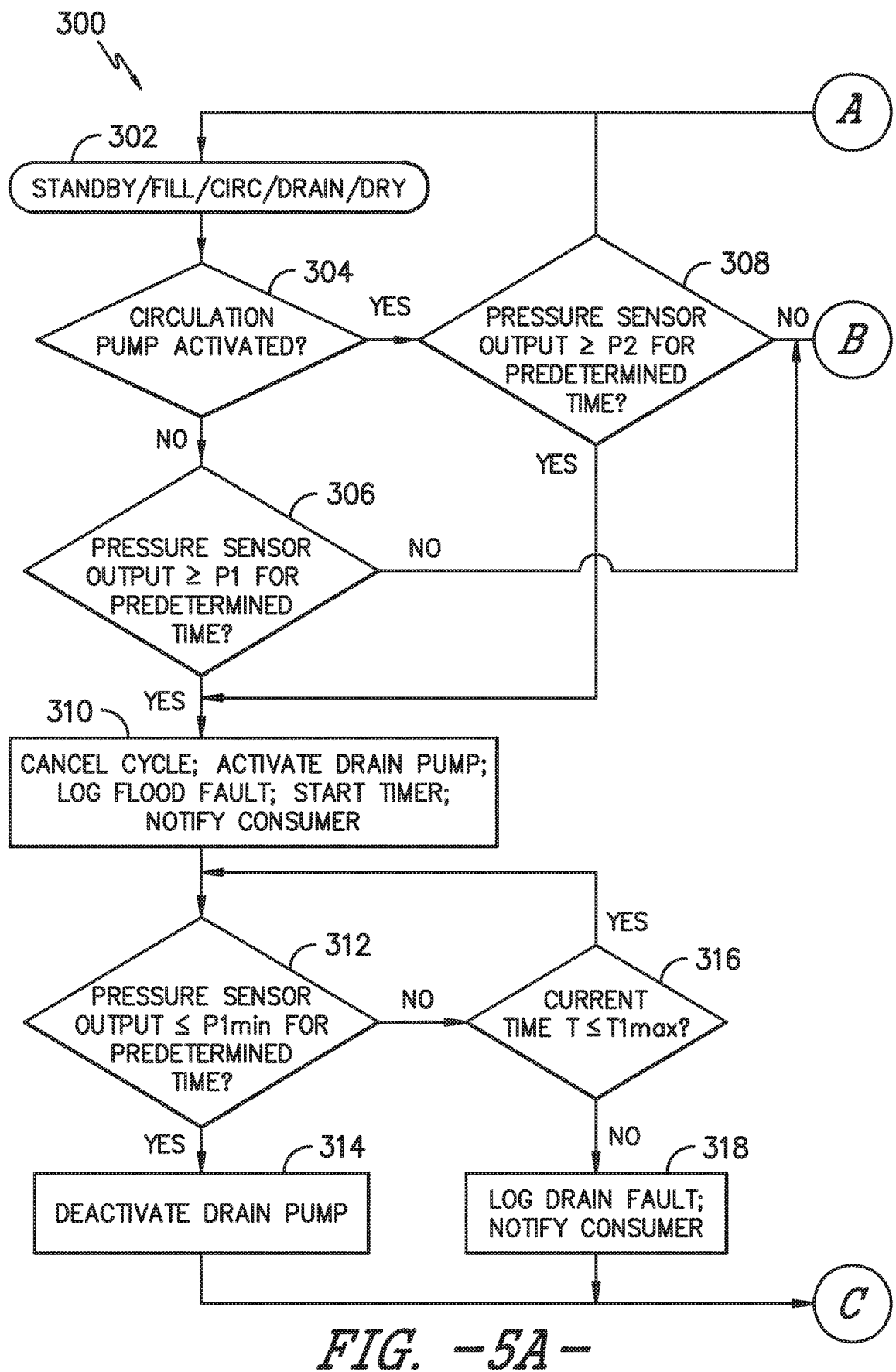
FIG. -5A-

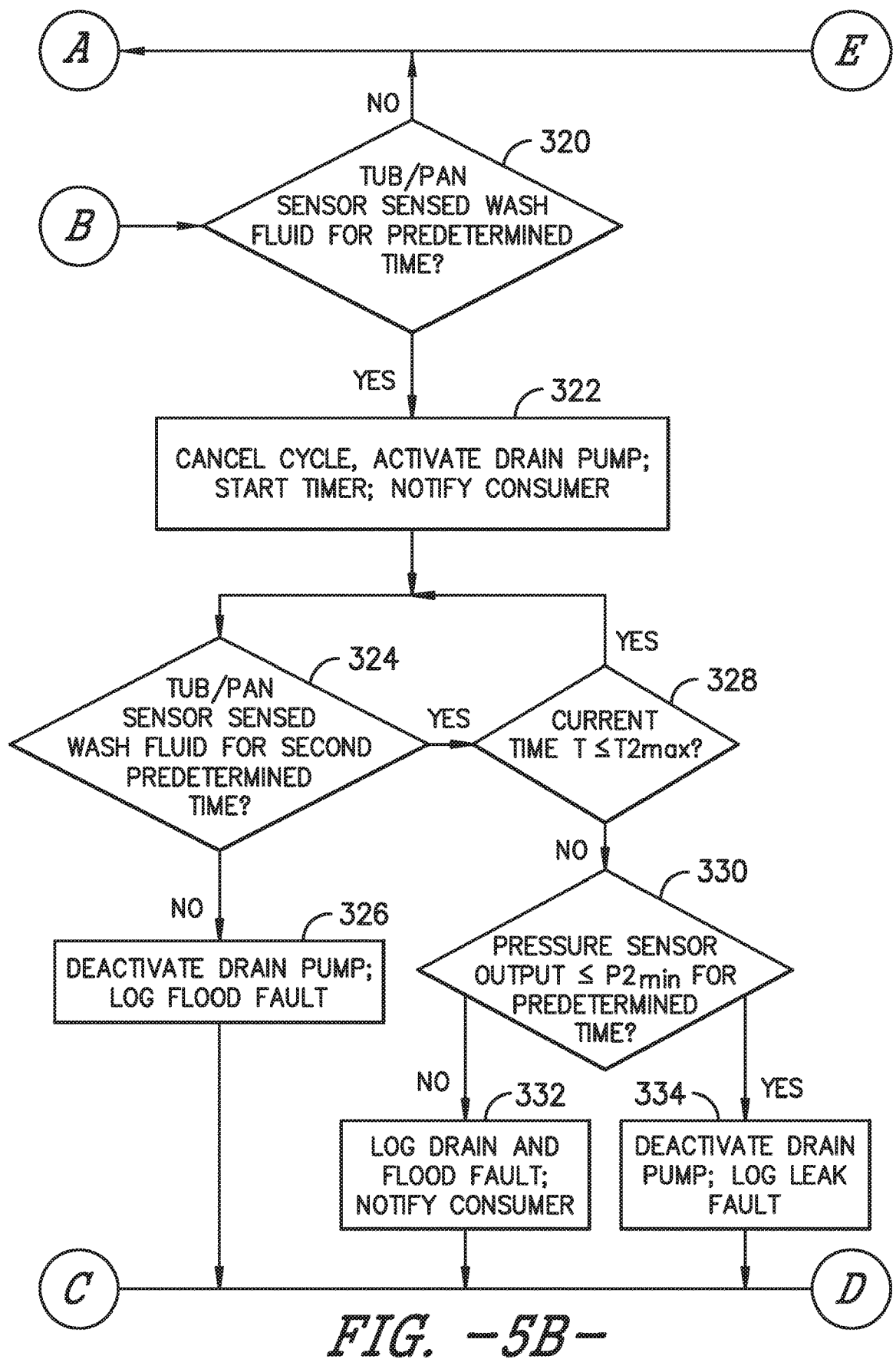
FIG. -5B-

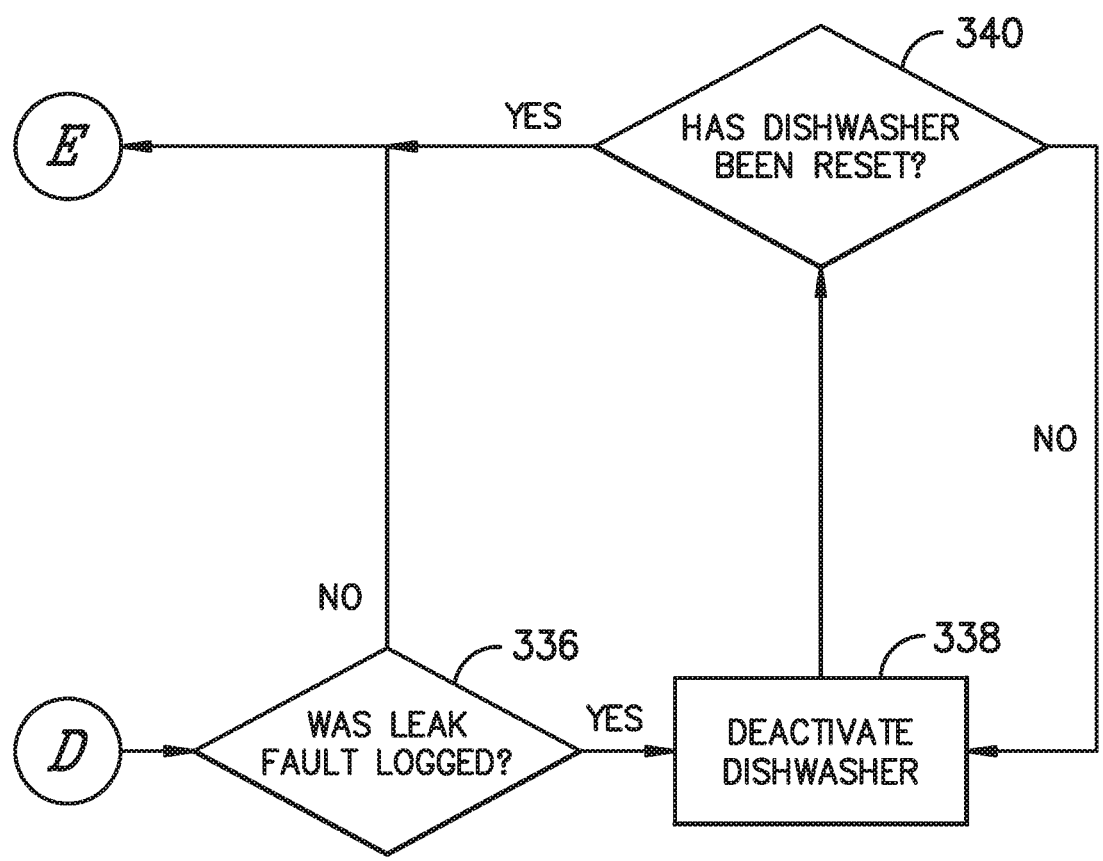
FIG. -5C-

DISHWASHER APPLIANCE CONFIGURED FOR FLOOD AND LEAK DETECTION

FIELD OF THE INVENTION

The present disclosure relates generally to dishwasher appliances, and more particularly to dishwasher appliances having flood and leak detection features.

BACKGROUND OF THE INVENTION

Dishwasher appliances generally include a tub that defines a wash chamber. Rack assemblies can be mounted within the wash chamber of the tub for receipt of articles for washing. Multiple spray assemblies can be positioned within the wash chamber for applying or directing wash fluid towards articles disposed within the rack assemblies in order to clean such articles. Dishwasher appliances are also typically equipped with a circulation pump for circulating fluid through the multiple spray assemblies.

Under certain conditions, dishwasher appliances are prone to flooding over a tub lip of the tub. For instance, dishwasher appliances may be prone to flooding over the tub lip during an out-of-level condition, an inlet water valve failure, and/or a drain pump failure. When one or more of such conditions occur, the water level can rise above the designed fill level and spill over the tub lip and onto the floor. This may be detrimental to consumers' homes.

Certain dishwasher appliances include features for detecting tub overfills or flood events. For example, some conventional dishwasher appliances include float sensors. To detect a flood event, the float sensor floats on top of the water in the tub, and if the float sensors floats upward to a certain height, the float sensor triggers a response indicating a flood event. One challenge with float sensors is that they are typically located proximate the sump area of the tub, and accordingly, such float sensors affect the water flow through the sump area during wash and drain cycles. This may decrease the efficiency and performance of the dishwasher appliance during normal operating conditions. Moreover, some conventional float sensors are located in the manual filter chamber where soiled water collects during a wash cycle. By locating the float sensor in the manual filter chamber, the volume of soiled water that can be collected is limited, which may negatively affect wash performance. Further, other conventional dishwasher appliances include pressure sensors that activate when the water level is excessively high. However, such pressure sensors can be prone to nuisance or inadvertent tripping and typically allow for little time for the dishwasher appliance to take corrective action to prevent a flood event.

In addition, in some instances, wash fluid may leak from the tub or another component of a dishwasher appliance. To prevent the wash fluid from spilling or pooling on a consumer's floor, some dishwasher appliances include drip or leak pans. Leak pans are configured to collect leaking wash fluid. Some dishwasher appliances include sensing devices for detecting wash fluid in their respective leak pans. However, feedback from such sensors is generally used passively to notify a consumer that moisture is present in the leak pan and is not used to actively control the dishwasher appliance. Thus, normal operation of such dishwasher appliances may continue while wash fluid overflows the leak pan, potentially damaging a consumer's floor.

Accordingly, dishwasher appliances that include flood prevention and/or leak detection features and methods therefore that address one or more of the challenges noted above would be useful.

BRIEF DESCRIPTION OF THE INVENTION

The present disclosure provides a dishwasher appliance that includes features for prevention and detection of flood events and/or leaks of the dishwasher appliance without sacrificing performance or efficiency of the dishwasher appliance. Moreover, methods for detecting and preventing such flood events and/or leaks are also provided. Additional aspects and advantages of the invention will be set forth in part in the following description, may be apparent from the description, or may be learned through practice of the invention.

In accordance with one exemplary embodiment, a method for detecting a flood event or a leak in a dishwasher appliance is provided. The dishwasher appliance defines a vertical direction and includes a cabinet and a tub positioned within the cabinet. The tub includes a tub lip. The dishwasher appliance further includes a leak pan positioned below the tub along the vertical direction. The dishwasher appliance further includes a pressure sensor, a tub lip sensor, a leak pan sensor electrically connected to the tub lip sensor in parallel, a circulation pump, and a drain pump. The method includes determining whether the circulation pump is activated. The method also includes determining whether a pressure sensor output of the pressure sensor is greater than or equal to a first pressure threshold for a predetermined time if the circulation pump is not activated, or, determining whether the pressure sensor output of the pressure sensor is greater than or equal to a second pressure threshold for a predetermined time if the circulation pump is activated. Further, the method includes determining whether the tub lip sensor has sensed wash fluid at or proximate the tub lip for a predetermined time or whether the leak pan sensor has sensed wash fluid in the leak pan for a predetermined time if the pressure sensor output is not greater than or equal to either the first pressure threshold or the second pressure threshold. The method also includes activating the drain pump if the tub lip sensor has sensed wash fluid at or proximate the tub lip for the predetermined time or if the leak pan sensor has sensed wash fluid in the leak pan for the predetermined time.

In accordance with another exemplary embodiment, a dishwasher appliance is provided. The dishwasher appliance defines a vertical direction. The dishwasher appliance includes a cabinet and a tub positioned within the cabinet and defining a wash chamber for receipt of articles for washing, the tub including a tub lip. The dishwasher appliance also includes a tub lip sensor positioned on or proximate the tub lip and configured to detect wash fluid at or proximate the tub lip. Further, the dishwasher appliance includes a circulation pump for circulating wash fluid throughout the dishwasher appliance. Moreover, the dishwasher appliance includes a sump and a pressure sensor mounted to the sump. The dishwasher appliance also includes a leak pan positioned below the sump along the vertical direction and a leak pan sensor positioned on or proximate the leak pan and configured to detect wash fluid in the leak pan. The leak pan sensor and the tub lip sensor are electrically connected in parallel. In addition, the dishwasher appliance includes a drain pump for draining wash fluid from the dishwasher appliance. Moreover, the dishwasher appliance includes a controller communicatively coupled with the pressure sensor, the tub lip sensor, the leak pan sensor, the circulation pump, and the drain pump, the controller configured to: determine whether the circulation pump is activated; determine whether a pressure sensor output of the pressure sensor is greater than or equal to a first pressure threshold for a predetermined time if the circulation pump is not activated, or, determine whether the pressure sensor output of the pressure sensor is greater than or equal to a second pressure threshold for a predetermined time if the circulation pump is activated; determine whether the tub lip sensor has sensed wash fluid at or proximate the tub lip for a predetermined time or whether the leak pan sensor has sensed wash fluid in the leak pan for a predetermined time if the pressure sensor output is not greater than or equal to either the first pressure threshold or the second pressure threshold; and activate the drain pump if the tub lip sensor has sensed wash fluid at or proximate the tub lip for the predetermined time or if the leak pan sensor has sensed wash fluid in the leak pan for the predetermined time.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of an exemplary embodiment of a dishwasher appliance of the present disclosure with a door in a partially open position;

FIG. 2 provides a side, cross sectional view of the exemplary dishwasher appliance of FIG. 1;

FIG. 3 provides a close up, cross sectional view of a sump and a pressure sensor of the dishwasher appliance of FIGS. 1 and 2;

FIG. 4 provides a perspective view of an exemplary tub lip sensor coupled with a tub lip of a tub of the dishwasher appliance of FIGS. 1 and 2 and a leak pan sensor coupled with a leak pan of the dishwasher appliance; and FIGS. 5A, 5B, and 5C provide a flow diagram of an exemplary method for detecting a flood event and/or leak according to exemplary embodiments of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to, but need not be limited to dishes, pots, pans, silverware, and other cooking utensils and items that can be cleaned in a dishwashing appliance. The term "wash cycle" is intended to refer to one or more periods of time during which a dishwashing appliance operates while containing the articles to be washed and uses a detergent and water, preferably with agitation, to e.g., remove soil particles including food and other undesirable elements from the articles. The term "rinse cycle" is intended to refer to one or more periods of time during which the dishwashing appliance operates to remove residual soil, detergents, and other undesirable elements that were retained by the articles after completion of the wash cycle. The term "drain cycle" is intended to refer to one or more periods of time during which the dishwashing appliance operates to discharge soiled water from the dishwashing appliance. The term "wash fluid" refers to a liquid used for washing and/or rinsing the articles and is typically made up of water that may include other additives such as detergent or other treatments. Furthermore, as used herein, terms of approximation, such as "approximately," "substantially," or "about," refer to being within a ten percent (10%) margin of error.

FIGS. 1 and 2 depict an exemplary dishwasher or dishwashing appliance 100 that may be configured in accordance with aspects of the present disclosure. For the particular embodiment of FIGS. 1 and 2, dishwasher 100 defines a vertical direction V, a lateral direction L, and a transverse direction T. Each of the vertical direction V, lateral direction L, and transverse direction T are mutually perpendicular to one another and form an orthogonal direction system. Dishwasher 100 includes a cabinet 102 having a tub 104 therein that defines a wash chamber 106. As shown in FIG. 2, tub 104 extends between a top 107 and a bottom 108 along the vertical direction V, between a pair of side walls 110 along the lateral direction L, and between a front side 111 and a rear side 112 along the transverse direction T.

Tub 104 includes a front opening 114 (FIG. 1) and a door 116 hinged at its bottom for movement between a normally closed vertical position (shown in FIG. 2), wherein the wash chamber 106 is sealed shut for washing operation, and a horizontal open position for loading and unloading of articles from the dishwasher 100. Dishwasher 100 includes a door closure mechanism or assembly 118 that is used to lock and unlock door 116 for accessing and sealing wash chamber 106.

As further shown in FIG. 2, tub side walls 110 accommodate a plurality of rack assemblies. More specifically, guide rails 120 are mounted to side walls 110 for supporting a lower rack assembly 122, a middle rack assembly 124, and an upper rack assembly 126. Upper rack assembly 126 is positioned at a top portion of wash chamber 106 above middle rack assembly 124, which is positioned above lower rack assembly 122 along the vertical direction V. Each rack assembly 122, 124, 126 is adapted for movement between an extended loading position (not shown) in which the rack is substantially positioned outside the wash chamber 106, and a retracted position (shown in FIGS. 1 and 2) in which the rack is located inside the wash chamber 106. This is facilitated, for example, by rollers 128 mounted onto rack assemblies 122, 124, 126, respectively. Although guide rails 120 and rollers 128 are illustrated herein as facilitating movement of the respective rack assemblies 122, 124, 126, it should be appreciated that any suitable sliding mechanism or member may be used according to alternative embodiments.

Some or all of the rack assemblies 122, 124, 126 are fabricated into lattice structures including a plurality of wires or elongated members 130 (for clarity of illustration, not all elongated members making up rack assemblies 122, 124, 126 are shown in FIG. 2). In this regard, rack assemblies 122, 124, 126 are generally configured for supporting articles within wash chamber 106 while allowing a flow of wash fluid to reach and impinge on those articles, e.g., during a cleaning or rinsing cycle. According to other exemplary embodiments, a silverware basket (not shown) may be removably attached to a rack assembly, e.g., lower rack assembly 122, for placement of silverware, utensils, and the like, that are otherwise too small to be accommodated by rack 122.

Dishwasher 100 further includes a plurality of spray assemblies for urging a flow of water or wash fluid onto the articles placed within wash chamber 106. More specifically, as illustrated in FIG. 2, dishwasher 100 includes a lower spray arm assembly 134 disposed in a lower region 136 of wash chamber 106 and above a sump 138 so as to rotate in relatively close proximity to lower rack assembly 122. Similarly, a mid-level spray arm assembly 140 is located in an upper region of wash chamber 106 and may be located below and in close proximity to middle rack assembly 124. In this regard, mid-level spray arm assembly 140 is generally configured for urging a flow of wash fluid up through middle rack assembly 124 and upper rack assembly 126. Additionally, an upper spray assembly 142 may be located above upper rack assembly 126 along the vertical direction V. In this manner, upper spray assembly 142 may be configured for urging and/or cascading a flow of wash fluid downward over rack assemblies 122, 124, and 126. As further illustrated in FIG. 2, upper rack assembly 126 may further define an integral spray manifold 144, which is generally configured for urging a flow of wash fluid substantially upward along the vertical direction V through upper rack assembly 126.

The various spray assemblies and manifolds described herein may be part of a fluid distribution system or fluid circulation assembly 150 for circulating water and wash fluid in tub 104. More specifically, fluid circulation assembly 150 includes a circulation pump 152 for circulating water and wash fluid (e.g., detergent, water, and/or rinse aid) in tub 104. Circulation pump 152 is located within sump 138 or within a machinery compartment located below sump 138 of tub 104. Circulation pump 152 is in fluid communication with an external water supply line (not shown) and sump 138. A water inlet valve 153 can be positioned between the external water supply line and circulation pump 152 to selectively allow water to flow from the external water supply line to circulation pump 152. Additionally or alternatively, water inlet valve 153 can be positioned between the external water supply line and sump 138 to selectively allow water to flow from the external water supply line to sump 138. Water inlet valve 153 can be selectively controlled to open to allow the flow of water into dishwasher 100 and can be selectively controlled to cease the flow of water into dishwasher 100. Further, fluid circulation assembly 150 may include one or more fluid conduits or circulation piping for directing water and/or wash fluid from circulation pump 152 to the various spray assemblies and manifolds. For example, for the embodiment depicted in FIG. 2, a primary supply conduit 154 extends from circulation pump 152, along rear 112 of tub 104 along the vertical direction V to supply wash fluid throughout wash chamber 106.

As further illustrated in FIG. 2, primary supply conduit 154 is used to supply wash fluid to one or more spray assemblies, e.g., to mid-level spray arm assembly 140 and upper spray assembly 142. However, it should be appreciated that according to alternative embodiments, any other suitable plumbing configuration may be used to supply wash fluid throughout the various spray manifolds and assemblies described herein. For example, according to another exemplary embodiment, primary supply conduit 154 could be used to provide wash fluid to mid-level spray arm assembly 140 and a dedicated secondary supply conduit (not shown) could be utilized to provide wash fluid to upper spray assembly 142. Other plumbing configurations may be used for providing wash fluid to the various spray devices and manifolds at any location within dishwasher appliance 100.

Each spray arm assembly 134, 140, 142, integral spray manifold 144, or other spray device may include an arrangement of discharge ports or orifices for directing wash fluid received from circulation pump 152 onto dishes or other articles located in wash chamber 106. The arrangement of the discharge ports, also referred to as jets, apertures, or orifices, may provide a rotational force by virtue of wash fluid flowing through the discharge ports. Alternatively, spray arm assemblies 134, 140, 142 may be motor-driven, or may operate using any other suitable drive mechanism. Spray manifolds and assemblies may also be stationary. The resultant movement of the spray arm assemblies 134, 140, 142 and the spray from fixed manifolds provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc.

In operation, circulation pump 152 draws wash fluid in from sump 138 and pumps it to a diverter 156, e.g., which is positioned within sump 138 of dishwasher appliance. Diverter 156 may include a diverter disk (not shown) disposed within a diverter chamber 158 for selectively distributing the wash fluid to the spray arm assemblies 134, 140, 142 and/or other spray manifolds or devices. For example, the diverter disk may have a plurality of apertures that are configured to align with one or more outlet ports (not shown) at the top of diverter chamber 158. In this manner, the diverter disk may be selectively rotated to provide wash fluid to the desired spray device.

According to an exemplary embodiment, diverter 156 is configured for selectively distributing the flow of wash fluid from circulation pump 152 to various fluid supply conduits, only some of which are illustrated in FIG. 2 for clarity. More specifically, diverter 156 may include four outlet ports (not shown) for supplying wash fluid to a first conduit for rotating lower spray arm assembly 134 in the clockwise direction, a second conduit for rotating lower spray arm assembly 134 in the counter-clockwise direction, a third conduit for spraying an auxiliary rack such as the silverware rack, and a fourth conduit for supply mid-level and/or upper spray assemblies 140, 142, e.g., such as primary supply conduit 154.

Drainage of soiled water within sump 138 may occur, for example, through drain assembly 166. In particular, water may exit sump through a drain and may flow through a drain conduit 167. A drain pump 168 may facilitate drainage of the soiled water by pumping the water to a drain line external to the dishwasher 100.

Dishwasher 100 is further equipped with a controller 160 to regulate operation of dishwasher 100. Controller 160 may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In some embodiments, the processor executes programming instructions stored in memory. The memory may be a separate component from the processor or may be included onboard within the processor. Alternatively, controller 160 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 160 may be positioned in a variety of locations throughout dishwasher 100. In the illustrated embodiment, controller 160 may be located within a control panel area 162 of door 116 as shown in FIGS. 1 and 2. In such an embodiment, input/output ("I/O") signals may be routed between the control system and various operational components of dishwasher 100 along wiring harnesses that may be routed through the bottom of door 116. Typically, the controller 160 includes a user interface panel/controls 164 through which a user may select various operational features and modes and monitor progress of dishwasher 100. In one embodiment, the user interface 164 may represent a general purpose I/O ("GPIO") device or functional block. In one embodiment, the user interface 164 may include input components, such as one or more of a variety of electrical, mechanical or electro-mechanical input devices including rotary dials, push buttons, and touch pads. The user interface 164 may include a display component, such as a digital or analog display device designed to provide operational feedback to a user. The user interface 164 may be in communication with the controller 160 via one or more signal lines or shared communication busses.

It should be appreciated that the invention is not limited to any particular style, model, or configuration of dishwasher 100. The exemplary embodiment depicted in FIGS. 1 and 2 is for illustrative purposes only. For example, different locations may be provided for user interface 164, different configurations may be provided for rack assemblies 122, 124, 126, different spray arm assemblies 134, 140, 142 and spray manifold configurations may be used, and other differences may be applied while remaining within the scope of the present subject matter.

With reference still to FIG. 2, in some instances, dishwasher 100 may experience a tub overfill or flood event, e.g., when wash fluid floods over a tub lip 170 of tub 104. Such an overfill or flood event can occur as a result of any number of conditions or failures, such as e.g., an out-of-level condition, an inlet water valve failure, and/or a drain pump failure. To detect such flood events, dishwasher 100 includes various sensors that provide feedback to controller 160 such that corrective action may be taken. More particularly, as shown in the depicted embodiment of FIG. 2, dishwasher 100 includes a pressure sensor 200 positioned on or mounted to sump 138. Pressure sensor 200 is configured to detect a liquid level within sump 138 and/or tub 104. Additionally, dishwasher 100 includes a tub lip sensor 202 positioned on or mounted to tub lip 170. Tub lip sensor 202 is configured to detect wash fluid at or proximate tub lip 170. Accordingly, in accordance with exemplary aspects of the present disclosure, dishwasher 100 may utilize outputs from pressure sensor 200 and feedback from tub lip sensor 202 to detect and/or prevent flood events.

Further, in some instances, dishwasher 100 may experience a leak or leak event. In such instances, wash fluid may leak from tub 104, sump 138, or another component of dishwasher 100. To prevent leaking wash fluid from spilling onto or pooling on a consumer's floor, for this embodiment, dishwasher 100 includes a leak pan 206 positioned below sump 138 and tub 104 along the vertical direction V. Leak pan 206 is configured to collect leaking wash fluid. In addition, as shown in FIG. 2, dishwasher 100 includes a leak pan sensor 204 positioned on or mounted to leak pan 206. Leak pan sensor 204 is configured to detect wash fluid in leak pan 206. Accordingly, in accordance with exemplary aspects of the present disclosure, dishwasher 100 may utilize feedback from leak pan sensor 204 to detect and/or prevent leak events.

FIG. 3 provides a close up, cross sectional view of sump 138 and pressure sensor 200 mounted thereto of the dishwasher 100 of FIGS. 1 and 2. As noted above, pressure sensor 200 is operatively configured to detect a liquid level L within sump 138 and/or tub 104 and then communicate the liquid level L to controller 160 via one or more signals. Thus, pressure sensor 200 and controller 160 are communicatively coupled. Pressure sensor 200 can send signals to controller 160 as a frequency, as an analog signal, or in another suitable manner. Pressure sensor 200 can be any suitable type of sensor capable of sensing the liquid level L within dishwasher 100.

For the depicted embodiment of FIG. 3, pressure sensor 200 is configured to sense the height H of the water above pressure sensor 200 along the vertical direction V, e.g., by measuring the pressure on pressure sensor 200. In particular, for this embodiment, pressure sensor 200 includes a pressure plate that is acted on by the pressure of the wash fluid within sump 138. As the liquid level L rises, the pressure plate is pushed upward along the vertical direction V and thus compresses air trapped within the housing and a diaphragm of pressure sensor 200, which causes the diaphragm to flex or alter its position. As a result of the pressure and consequent movement of the diaphragm, a permanent magnet attached to the diaphragm may change its position in relation to a Hall-effect transducer. The transducer delivers one or more electrical signals proportional to the magnetic field of the magnet. The signals may be linearized, digitized, and/or amplified before being sent to controller 160 for processing. The pressure sensor may include a printed circuit board (PCB) board to electrically connect the various electrical components. As noted above, other types of pressure sensors 200 are contemplated.

FIG. 4 provides a perspective view of tub lip sensor 202 coupled with or attached to tub lip 170 of tub 104 and leak pan sensor 204 coupled with or attached to leak pan 206 of the dishwasher appliance 100 of FIGS. 1 and 2. As noted above, tub lip sensor 202 is operatively configured to detect high water or wash fluid levels within tub 104, and more particularly, tub lip sensor 202 is configured to sense wash fluid that is at or proximate tub lip 170. Tub lip sensor 202 is communicatively coupled with controller 160 and may communicate with controller 160 via one or more signals. In this way, appropriate action can be taken to prevent an overfill or flood event.

Notably, for the depicted embodiment of FIG. 4, tub lip sensor 202 is positioned on or mounted to tub lip 170 of tub 104, and more particularly, tub lip sensor 202 is positioned on or mounted to tub lip 170 at front side 111 of tub 104 for this embodiment. By positioning tub lip sensor 202 at or on tub lip 170, tub lip sensor 202 does not interfere with the water flow through sump 138 during wash or drain cycles and takes up a minimal amount of space, e.g., compared to float sensors. In addition, by placing tub lip sensor 202 at front side 111 of tub 104, tub lip sensor 202 is advantageously positioned to detect water spillage or floods over the front portion of tub 104, which is a location where water is likely to spill or flood onto the floor of a consumer's home in the event of a water breach over this portion of tub 104. Further, for this embodiment, tub lip sensor 202 is positioned approximately along a lateral centerline LC that extends along the transverse direction T midway along the lateral length of tub 104. In this way, tub lip sensor 170 may still detect high wash fluid levels during out-of-level conditions, e.g., tilting of the dishwasher 100 about the transverse direction T.

In the depicted embodiment of FIG. 4, tub lip sensor 202 is a conductivity sensor. That is, when water or wash fluid fills up to tub lip 170, the wash fluid bridges leads or electrical contacts of tub lip sensor 202, thus allowing an electrical current to travel from one lead to the other. This completes a circuit that includes the electrical leads of tub lip sensor 202 and controller 160, among other possible electrical components. The change or increase in electrical current through the circuit is indicative that wash fluid is present or sensed at tub lip 170. The change in electrical current through the circuit can be measured by any suitable parameter (e.g., a change in current, voltage, or resistance) and by any suitable device (e.g., a multimeter positioned within controller 160).

As further provided in FIG. 4, as noted above, leak pan sensor 204 is operatively configured to detect wash fluid in leak pan 206. Moreover, for this embodiment, leak pan sensor 204 is configured to sense wash fluid that is a predetermined distance from a pan lip 208 of leak pan 206. Leak pan sensor 204 is communicatively coupled with controller 160 and may communicate with controller 160 via one or more signals. In this manner, appropriate action can be taken in the event wash fluid is leaking from dishwasher 100.

In the depicted embodiment of FIG. 4, leak pan sensor 204 is a conductivity sensor. That is, when water or wash fluid fills to the predetermined distance from the pan lip 208 of leak pan 206, the wash fluid bridges leads or electrical contacts of leak pan sensor 204, thus allowing an electrical current to travel from one lead to the other. This completes a circuit that includes the electrical leads of leak pan sensor 204 and controller 160, among other possible electrical components. The change or increase in electrical current through the circuit is indicative that wash fluid is present or sensed within leak pan 206, and more particularly, the increase in electrical current between the leads of leak pan sensor 204 is indicative of wash fluid being present at a predetermined distance from pan lip 208.

Moreover, for this embodiment, the leak pan sensor 204 is electrically connected in parallel with tub lip sensor 202. By electrically connecting leak pan sensor 204 in parallel with tub lip sensor 202, wiring costs of dishwasher 100 may be reduced, among other benefits.

FIGS. 5A, 5B, and 5C provide a flow diagram of an exemplary method (300) for detecting and/or preventing a flood event of a dishwasher appliance and/or detecting/preventing a leak from a dishwasher appliance according to exemplary embodiments of the present disclosure. For instance, the method (300) can be used to detect and/or prevent floods and/or leaks of the dishwasher appliance 100 of FIGS. 1 through 4. Further, as will be explained below, outputs of the pressure sensor 200 of FIGS. 2 and 3 and the tub lip sensor 202 and leak pan sensor 204 of FIGS. 2 and 4 can be utilized to detect and prevent flood events and/or leak events of dishwasher 100. To provide context to exemplary method (300), the reference numerals used in FIGS. 1 through 4 to describe the features of dishwasher 100 will be used below. It will be appreciated, however, that method (300) is not limited in scope to dishwasher 100 of FIGS. 1 through 4; rather, method (300) is applicable to other suitable types and models of dishwashers.

At (302), with reference to FIG. 5A, method (300) includes powering up or operating a dishwasher. For instance, dishwasher 100 can be powered in a standby mode (e.g., power is supplied to dishwasher 100 but dishwasher is not performing a cycle). Moreover, dishwasher 100 can be operated in a given cycle, including for example, a fill cycle, a circulation cycle, a drain cycle, or a dry cycle. So long as power is supplied to dishwasher 100, method (300) commences.

In some implementations, when method (300) commences at (302), controller 160 receives a pressure sensor output indicative of the liquid level L within sump 138 and tub 104. For instance, for this implementation, controller 160 receives a signal from pressure sensor 200 indicative of the height H of the wash fluid above pressure sensor 200, which is in turn indicative of the liquid level L within sump 138 and tub 104. Controller 160 can receive the pressure sensor output directly or indirectly from pressure sensor 200. Preferably, controller 160 receives pressure sensor outputs continuously at a predetermined interval, such as e.g., every tenth of a second, every half second, every second, etc. In this way, dishwasher 100 constantly monitors for flood events.

At (304), method (300) includes determining whether the circulation pump is activated. Stated differently, method (300) includes determining whether wash fluid is being circulated about or through dishwasher 100. As one example, to determine whether circulation pump 152 is activated, controller 160 can receive one or more signals from circulation pump 152 indicating that circulation pump 152 is activated. As another example, controller 160 can be configured to control circulation pump 152 and logic within controller 160 can be used to determine whether circulation pump 152 is activated. Determining whether circulation pump 152 is activated can be determined in other suitable manners as well.

Notably, for this embodiment, determining whether circulation pump 152 is active will determine which pressure threshold will be compared against the pressure sensor output received by controller 160. That is, whether the circulation pump 152 is activated determines whether the pressure sensor output is compared to a first pressure threshold P1 at (306) or a second pressure threshold P2 at (308). If the circulation pump is not activated as determined at (304) (i.e., there is no wash fluid being circulated through dishwasher 100), most or at least a majority of the wash fluid is held in sump 138. If the circulation pump is activated as determined at (304) (i.e., circulation pump 152 is circulating water and wash fluid through dishwasher 100), the liquid level L within sump 138 is expected to be lower as some of the wash fluid is actively being dispersed by one or more of the spray arm assemblies 134, 140, 142. Thus, there is less wash fluid in sump 138 when circulation pump 152 is active compared to when the circulation pump 152 is not active. As such, there are different pressure thresholds depending on whether circulation pump 152 is activated, and for this embodiment, the first pressure threshold P1 is a greater than the second pressure threshold P2.

At (306), if the circulation pump is not activated as determined at (304), then method (300) includes determining whether a pressure sensor output of the pressure sensor is greater than or equal to a first pressure threshold for a predetermined time. That is, at (306) it is determined whether the pressure sensor output received by controller 160 is greater than or equal to the first pressure threshold P1 for a predetermined time. The predetermined time can be, for example, between about three (3) and five (5) seconds. Preferably, in some implementations, in determining whether the pressure sensor output of pressure sensor 200 is greater than or equal to the first pressure threshold P1 for the predetermined time, the pressure sensor output must be consecutively greater than or equal to the first pressure threshold P1 for the predetermined time. In this way, it is less probable or likely that pressure sensor 200 has been inadvertently or nuisance tripped.

If at (306) it is determined that the pressure sensor output is not greater than or equal to the first pressure threshold P1, then the controller logic proceeds to (320) to check to see if wash fluid is present at tub lip 170 or in leak pan 206, as will be explained in greater detail below. In this way, in the event pressure sensor 200 fails or otherwise fails to correctly output the pressure sensor output indicative of the liquid level L within dishwasher 100, dishwasher 100 may still detect and/or prevent flood and leak events. If, however, at (306) it is determined that the pressure sensor output is greater than or equal to the first pressure threshold P1, then it is determined that there is presently a flood event or about to be a flood event in dishwasher 100. As such, the controller logic proceeds to (310).

At (308), if the circulation pump is activated as determined at (304), then method (300) includes determining whether the pressure sensor output of the pressure sensor is greater than or equal to a second pressure threshold for a predetermined time. That is, at (308) it is determined whether the pressure sensor output received by controller 160 is greater than or equal to the second pressure threshold P2 for a predetermined time. The predetermined time can be between about three (3) and five (5) seconds, for example. In some implementations, in determining whether the pressure sensor output of pressure sensor 200 is greater than or equal to the second pressure threshold P2 for the predetermined time, the pressure sensor output must be consecutively greater than or equal to the second pressure threshold P2 for the predetermined time. In this way, it is less probable or likely that pressure sensor 200 has been inadvertently or nuisance tripped.

If at (308) it is determined that the pressure sensor output is not greater than or equal to the second pressure threshold P2, then the controller logic proceeds to (320) to check to see if wash fluid is present at tub lip 170 or in leak pan 206. In this manner, in the event pressure sensor 200 fails or otherwise fails to correctly output the pressure sensor output indicative of the liquid level L within dishwasher 100, dishwasher 100 may still detect and/or prevent flood and leak events. If, however, at (308) it is determined that the pressure sensor output is greater than or equal to the second pressure threshold P2, then it is determined that there is presently a flood event or about to be a flood event in dishwasher 100. As such, the controller logic proceeds to (310).

At (310), the method (300) includes activating the drain pump if the pressure sensor output is greater than or equal to either the first pressure threshold for the predetermined time or the second pressure threshold for the predetermined time. Thus, corrective action in response to the detected flood event can be taken. Preferably, drain pump 168 removes wash fluid from sump 138 and tub 104 at a faster rate than water and/or wash fluid flows into sump 138. In this manner, drain pump 168 can overcome the flow rate of water inlet valve 153, particularly if water inlet valve 153 has failed. Further, in some implementations, drain pump 168 removes wash fluid from sump 138 at twice or at least twice the rate of wash fluid entering sump 138. As one example, drain pump 168 removes fluid from sump 138 at three (3) gallons per minute (gpm) and water inlet valve 153 allows for a flow rate into sump 138 at a flow rate of 0.8 gpm.

In some implementations, at (310), the method (300) includes starting a timer. The starter can be a component of controller 160 or can be a separate component communicatively coupled with controller 160, for example. In such implementations, as will be explained below, the timer is started so that if the liquid level L within sump 138 is not below a certain threshold within a predetermined time, the consumer is notified so that corrective action may be taken. Moreover, preferably, the starting of the timer is coordinated with the activation of drain pump 168. That is, the timer is started upon activation of drain pump 168. In this way, the activated drain pump 168 does not run indefinitely without the consumer being notified in the event the drain pump 168 simply cannot remove the wash fluid from sump 138, e.g., due to a water inlet valve failure. This may, for example, improve the service life of drain pump 168.

In implementations where dishwasher 100 is performing a cycle, particularly a rinse or wash cycle, additionally or alternatively to activating drain pump 168, method (300) includes cancelling a current cycle of the dishwasher appliance if the pressure sensor output is greater than or equal to either the first pressure threshold P1 or the second pressure threshold P2 as determined at (306) or (308), respectively. When the pressure sensor output is greater than or equal to either the first pressure threshold P1 or the second pressure threshold P2, controller 160 effectively determines that a flood event has occurred or is on the verge or precipice of a flood event, as noted above. Thus, equipped with such information, dishwasher 100 can take corrective action to potentially prevent the flood event or reduce the potential damage of the flood event.

As one example, as noted above, the current cycle being performed by dishwasher appliance 100 can be canceled. For instance, if dishwasher 100 is performing a wash or rinse cycle, to cancel the cycle, the method (300) can include deactivating water inlet valve 153 (e.g., closing the valve to a closed position (assuming it is still operable)) to prevent further water from entering dishwasher 100. Moreover, method (300) can likewise include deactivating circulation pump 152. In this way, energy can be conserved and will allow the wash fluid to flow back to sump 138 such that it can be removed from dishwasher 100.

In some further implementations, at (310), the method (300) includes logging a flood fault. In this way, if dishwasher 100 is serviced, an operator can quickly ascertain why dishwasher 100 was cancelled mid-cycle. Moreover, in some implementations, as shown at (310), the method (300) includes notifying a consumer that the cycle has been cancelled and that a flood event or possible flood event has occurred. For instance, as one example, dishwasher 100 may include a speaker that audibly communicates the notification to a consumer. As another example, dishwasher 100 may include a communication interface that is communicatively coupled with controller 160. The communication interface may include a network interface that provides for communication over a network, such as e.g., a wireless network. In such implementations, dishwasher 100 may send notifications to a consumer's user device, such as e.g., a cell phone.

At (312), the method (300) includes determining whether the pressure sensor output is less than or equal to a minimum pressure threshold $P1_{MIN}$ for a predetermined time. That is, the pressure sensor outputs received by controller 160 are compared to a minimum pressure threshold $P1_{MIN}$. The minimum pressure threshold $P1_{MIN}$ corresponds with a liquid level L within sump 138 that provides a degree of safety that dishwasher appliance 100 is not currently flooded or not about to be flooded. In some implementations, in determining whether the pressure sensor output is less than or equal to the minimum pressure threshold $P1_{MIN}$, the pressure sensor output must be consecutively less than or equal to the minimum pressure threshold $P1_{MIN}$ for the predetermined time. In this way, it is less probable or likely that pressure sensor 200 has been inadvertently or nuisance tripped. The predetermined time can be, for example, between about three (3) and five (5) seconds.

If at (312) it is determined that the pressure sensor output is less than or equal to the minimum pressure threshold $P1_{MIN}$ for the predetermined time, then it is determined that there is no longer a flood or threat of a flood within dishwasher 100, and as will be explained below at (314), drain pump 168 is deactivated. If, however, at (312) it is determined that the pressure sensor output is not less than or equal to the minimum pressure threshold $P1_{MIN}$, then a current time T is compared against a predetermined time threshold $T1_{MAX}$ at (316).

At (314), if the pressure sensor output is less than or equal to the minimum pressure threshold $P1_{MIN}$ for the predetermined time, the method (300) includes deactivating the drain pump. As noted above, if it is determined at (312) that the pressure sensor output is less than or equal to the minimum pressure threshold $P1_{MIN}$, then there is no longer a flood event or threat of a flood event. As such, to save energy, drain pump 168 is deactivated. After deactivating the drain pump at (314), the controller logic proceeds to (336) as will be explained further below.

At (316), if the pressure sensor output is not less than or equal to the minimum pressure threshold $P1_{MIN}$ for the predetermined time, the method (300) includes determining whether a current time is less than or equal to a predetermined time threshold $T1_{MAX}$. The predetermined time threshold $T1_{MAX}$ can be, for example, twelve (12) hours, twenty-four (24) hours, thirty-six (36) hours, forty-eight hours (48), etc. The predetermined time threshold $T1_{MAX}$ is kept by the timer.

If the current time T is less than or equal to the predetermined time threshold $T_{MAX}$, the controller logic loops back to (312). In this way, controller 160 can continue to monitor the liquid level L within sump 138. If the current time T is not less than or equal to predetermined time threshold $T1_{MAX}$, then the controller logic proceeds to (318).

At (318), if the current time T is not less than or equal to the predetermined time threshold $T1_{MAX}$, the method (300) includes logging a drain fault. If the current time T is not less than or equal to the predetermined time threshold $T1_{MAX}$, controller 160 recognizes that for one reason or another the wash fluid within sump 138 cannot be removed. For example, in implementations where drain pump 168 is activated and cannot remove the wash fluid from sump 138 within predetermined time threshold $T1_{MAX}$, the system recognizes that there is a malfunction of some component (e.g., water inlet valve 153) that is preventing the wash fluid from being drained from sump 138. The drain fault is logged to assist an operator with taking corrective action. After logging the drain fault at (318), the controller logic proceeds to (336) as will be explained further below. Further, in some implementations at (318), the method (300) includes notifying a consumer that there has been a drain failure. In this way, a consumer can take necessary corrective actions to prevent dishwasher 100 from flooding. A consumer may be notified in any of the exemplary ways noted above at (310).

At (320), with reference now to FIG. 5B, if the pressure sensor output is not greater than or equal to either the first pressure threshold or the second pressure threshold as determined at (306) or (308), respectively, the method (300) includes determining whether the tub lip sensor has sensed wash fluid at or proximate the tub lip for a predetermined time or whether the leak pan sensor has sensed wash fluid in the leak pan for a predetermined time. That is, at (320) it is determined whether tub lip sensor 202 has sensed wash fluid at or proximate tub lip 170 for a predetermined time or whether leak pan sensor 204 has sensed wash fluid in leak pan 206 for a predetermined time.

With regard to sensing wash fluid at or proximate tub lip 170, the predetermined time can be, for example, between about three (3) and five (5) seconds. Preferably, in some implementations, in determining whether the tub lip sensor 202 has sensed wash fluid at or proximate tub lip 170 for the predetermined time, wash fluid must be sensed at or proximate tub lip 170 consecutively for the predetermined time. Stated alternatively, tub lip sensor 202 must sense wash fluid at or proximate the tub lip 170 for the entire predetermined period. In this way, it is less probable or likely that tub lip sensor 202 has been inadvertently or nuisance tripped by splashing wash fluid.

As one example, where tub lip sensor 202 is a conductivity sensor as noted above, to sense wash fluid at or proximate tub lip 170, if the tub lip sensor 202 is closed for a consecutive predetermined time (e.g., wash fluid has breached the leads of the sensor for a consecutive period of time), it may be determined that wash fluid is present at or proximate tub lip 170, and thus, a flood event has likely occurred or about to occur. If, however, the tub lip sensor 202 remains open or has not closed for a consecutive predetermined time, a determination may be made that wash fluid is not present at or proximate tub lip 170. Consequently, it may be determined that a flood event has likely not occurred or about to occur.

With regard to sensing wash fluid in leak pan 206, the predetermined time can be, for example, between about three (3) and five (5) seconds. Preferably, in some implementations, in determining whether leak pan sensor 204 has sensed wash fluid in leak pan 206 for the predetermined time, wash fluid must be sensed in leak pan 206 consecutively for the predetermined time. Stated alternatively, leak pan sensor 204 must sense wash fluid in leak pan 204 for the entire predetermined period. In this manner, it is less probable or likely that leak pan sensor 204 has been inadvertently or nuisance tripped.

As one example, where leak pan sensor 204 is a conductivity sensor as noted above, to sense wash fluid in leak pan 206 (e.g., a predetermined distance away from pan lip 208), if leak pan sensor 204 is closed for a consecutive predetermined time (e.g., wash fluid has breached the leads of the sensor for a consecutive period of time), it may be determined that wash fluid is present in leak pan 206, and thus, a leak event has likely occurred or about to occur. If, however, leak pan sensor 204 remains open or has not closed for a consecutive predetermined time, a determination may be made that wash fluid is not present in leak pan 206 (or at the predetermined distance from pan lip 208). Consequently, it may be determined that a leak event has likely not occurred or about to occur.

If at (320) it is determined that tub lip sensor 202 has not sensed wash fluid proximate tub lip 170 for the predetermined time, then it is determined that there is not currently or about to be a flood event or a leak event and the controller logic loops back to (302) and method (300) begins again as shown in FIG. 5A. As tub lip sensor 202 is electrically connected with leak pan sensor 204 in parallel in this exemplary embodiment, if tub lip sensor 202 or leak pan sensor 204 (or both) has sensed wash fluid at or proximate tub lip 170 or in leak pan 206, respectively, then at (320) it is determined that dishwasher 100 is currently experiencing at least one of a flood event and a leak event (or both). Accordingly, the controller logic proceeds to (322), and thus, in accordance with exemplary aspects of the present disclosure, corrective action may be taken.

At (322), the method (300) includes activating the drain pump if the tub lip sensor has sensed wash fluid at or proximate the tub lip for the predetermined time or if the leak pan sensor has sensed wash fluid in the leak pan for the predetermined time. Thus, corrective action in response to the detected flood event can be taken. Preferably, drain pump 168 removes wash fluid from dishwasher 100 at a faster rate than water and/or wash fluid flows into sump 138.

In some implementations, during activating the drain pump at (322), the method (300) includes starting a timer. In such implementations, as will be explained further below at (328), the timer is started so that a current time T can be compared to a predetermined time threshold $T2_{MAX}$. The appropriate next steps are taken depending on whether the current time T is greater or less than (or equal to) the predetermined time threshold $T2_{MAX}$. Preferably, the starting of the timer is coordinated with the activation of drain pump 168. In this way, the activated drain pump 168 does not run indefinitely without the consumer being notified in the event drain pump 168 simply cannot remove the wash fluid from dishwasher 100, e.g., due to a water inlet valve failure or due to the fact that dishwasher 100 is only experiencing a leak event.

Moreover, in implementations where dishwasher 100 is operating a cycle, additionally or alternatively to activating the drain pump, at (322) the method (300) includes canceling a current cycle of the dishwasher appliance if the tub lip sensor has sensed wash fluid at or proximate the tub lip for the predetermined time or the leak pan sensor has sensed wash fluid in the leak pan for the predetermined time as determined at (320). That is, if a flood or leak event is detected at (320), corrective measures are taken and thus method (300) may include canceling the current cycle of dishwasher 100. By way of example, if dishwasher 100 is performing a wash or rinse cycle, canceling the current cycle includes deactivating the inlet water valve and/or deactivating the circulation pump. Deactivating water inlet valve 153 (e.g., closing the valve to a closed position) prevents further water from flowing into dishwasher 100. Deactivating circulation pump 152 ceases the circulation of wash fluid through or about dishwasher 100. In this way, energy can be conserved and wash fluid is allowed to flow back to sump 138 such that it can be removed from dishwasher 100, e.g., by drain pump 168.

In some implementations, at (322), the method (300) includes notifying a consumer that the cycle has been cancelled. Additionally or alternatively, method (300) includes notifying a consumer that either a flood or leak event has been detected. For instance, as noted previously, dishwasher 100 may include a speaker that audibly communicates the notification to a consumer. As another example, dishwasher 100 may include a communication interface that is communicatively coupled with controller 160. The communication interface may include a network interface that provides for communication over a network, such as e.g., a wireless network. In such implementations, dishwasher 100 may send notifications to a consumer's user device, such as e.g., a watch.

At (324), after activating the drain pump and/or canceling the current cycle of dishwasher 100 at (322), the method (300) includes determining whether the tub lip sensor has sensed wash fluid at or proximate the tub lip for a second predetermined time or whether the leak pan sensor has sensed wash fluid in the leak pan for a second predetermined time. Stated alternatively, after one or more corrective actions are taken, e.g., canceling the current cycle of dishwasher 100 and/or activating drum pump 168, controller 160 monitors whether wash fluid is present at or proximate tub lip 170 for the second predetermined time, such as e.g., about three (3) to five (5) seconds, or whether wash fluid is present in leak pan 206 for the second predetermined time, such as e.g., about three (3) to five (5) seconds.

Preferably, in some implementations, in determining whether tub lip sensor 202 has sensed wash fluid at or proximate tub lip 170 for the second predetermined time, wash fluid must be sensed at or proximate tub lip 170 consecutively for the second predetermined time. Stated alternatively, tub lip sensor 202 must sense wash fluid at or proximate tub lip 170 for the entire second predetermined period. In this way, it is less probable or likely that tub lip sensor 202 has been inadvertently or nuisance tripped by splashing wash fluid. Moreover, preferably, in such implementations, in determining whether leak pan sensor 204 has sensed wash fluid in leak pan 206 for the second predetermined time, wash fluid must be sensed in leak pan 206 consecutively for the second predetermined time. Stated alternatively, leak pan sensor 204 must sense wash fluid in leak pan 204 for the entire second predetermined period. In this manner, it is less probable or likely that leak pan sensor 204 has been inadvertently or nuisance tripped.

As one example, the controller 160 can determine whether tub lip sensor 202 has been electrically opened consecutively for the second predetermined time (e.g., two (2) seconds) or whether leak pan sensor 204 has been electrically opened consecutively for the second predetermined time (e.g., three (3) seconds). Stated differently, controller 160 can determine whether wash fluid has bridged the electrical leads of the conductivity tub lip sensor 202 for the second predetermined time or whether wash fluid has bridged the electrical leads of the conductivity leak pan sensor 204 for the second predetermined time.

If at (324) it is determined that tub lip sensor 202 has not sensed wash fluid at or proximate tub lip 170 for the second predetermined time or that leak pan sensor 204 has not sensed wash fluid in the leak pan 206 for the second predetermined time, then as will be explained below at (326), it is determined that dishwasher 100 is no longer experiencing a flood event and that there was not a leak event. In addition, drain pump 168 is deactivated and a flood fault is logged. If, however, at (324) it is determined that tub lip sensor 202 has sensed wash fluid at or proximate tub lip 170 for the second predetermined time or that leak pan sensor 204 has sensed wash fluid in leak pan 206 for the second predetermined time, controller 160 determines that the flood or leak event has not been corrected. Accordingly, the controller logic proceeds to (328) to determine whether the current time T is less than or equal to a predetermined time threshold $T2_{MAX}$.

At (326), the method (300) includes deactivating the drain pump if the tub lip sensor has not sensed wash fluid proximate the tub lip for the second predetermined and the leak pan sensor has not sensed wash fluid in the leak pan for the second predetermined time. As noted above, if it is determined at (324) that tub lip sensor 202 has not sensed wash fluid at or proximate tub lip 170 for the second predetermined time and that the leak pan sensor 204 has not sensed wash fluid in leak pan 206 for the second predetermined time, then dishwasher 100 is no longer experiencing a flood event (i.e., the wash fluid has been removed from dishwasher 100 via drain pump 168), and if leak pan sensor 204 has not sensed wash fluid in leak pan 206 for the second predetermined time, then dishwasher 100 did not actually experience a leak event. Accordingly, drain pump 168 is deactivated. Further, at (326), exemplary method (300) also includes logging a flood fault. The logged flood fault can contain information representative of the length of time that dishwasher 100 experienced a flood fault and that drain pump 168 was able to properly drain the excess wash fluid within dishwasher 100, among other information.

At (328), if the tub lip sensor has sensed wash fluid at or proximate the tub lip for the second predetermined time or if the leak pan sensor has sensed wash fluid in the leak pan at (324), the method (300) includes determining whether a current time T is less than or equal to a predetermined time threshold $T2_{MAX}$. The predetermined time threshold $T2_{MAX}$ can be, for example, five (5) minutes, ten (10) minutes, one (1) hour, or two (2) hours. The predetermined time threshold $T2_{MAX}$ is kept by the timer. If the current time T is less than or equal to the predetermined time threshold $T2_{MAX}$, the controller logic loops back to (324). In this way, controller 160 can continue to monitor whether wash fluid is at or proximate tub lip 170 or in leak pan 206. If the current time T is not less than or equal to the predetermined time threshold $T2_{MAX}$ (i.e., the current time T is greater than or equal to the predetermined time threshold $T2_{MAX}$), then the controller logic proceeds to (330). Stated alternatively, if the corrective measures taken at (322) have not corrected the flood event within the predetermined time threshold $T2_{MAX}$, the controller logic proceeds to (330).

At (330), if the current time T is not less than or equal to the predetermined time threshold $T2_{MAX}$, the method (300) includes determining whether the pressure sensor output is less than or equal to a second minimum pressure threshold $P2_{MIN}$ for a predetermined time. That is, the pressure sensor outputs received by controller 160 are compared to the second minimum pressure threshold $P2_{MIN}$. The second minimum pressure threshold $P2_{MIN}$ corresponds with a liquid level L within sump 138 or tub 104 that provides a degree of safety that dishwasher appliance 100 is not currently flooded or not about to be flooded. In some implementations, in determining whether the pressure sensor output is less than or equal to the second minimum pressure threshold $P2_{MIN}$, the pressure sensor output must be consecutively less than or equal to the second minimum pressure threshold $P2_{MIN}$ for the predetermined time. In this way, it is less probable or likely that pressure sensor 200 has been inadvertently or nuisance tripped. The predetermined time can be, for example, between about three (3) and five (5) seconds. In some implementations, the second minimum pressure threshold $P2_{MIN}$ is the same pressure threshold as the minimum pressure threshold $P1_{MIN}$ of (312). In yet other implementations, the second minimum pressure threshold $P2_{MIN}$ is a different pressure threshold than the minimum pressure threshold $P1_{MIN}$.

If at (330) it is determined that the pressure sensor output is less than or equal to the second minimum pressure threshold $P2_{MIN}$ for the predetermined time, then it is determined that there is no longer a flood or threat of a flood within dishwasher 100, there is not a draining issue with dishwasher 100, and that dishwasher 100 is experiencing a leak event as none of the corrective measures taken at (322) have been able to correct the problem. Accordingly, as will be explained below at (334), drain pump 168 is deactivated and a leak fault is logged. If, however, at (330) it is determined that the pressure sensor output is not less than or equal to the second minimum pressure threshold $P2_{MIN}$, then it is determined that dishwasher 100 is experiencing a flood event and that dishwasher 100 has a draining issue; thus, both a flood and drain fault are logged at (332).

At (332), if the pressure sensor output is not less than or equal to the second minimum pressure threshold $P2_{MIN}$ for the predetermined time (i.e., if the pressure sensor output is greater than or equal to the second minimum pressure threshold $P2_{MIN}$ for the predetermined time), the method (300) includes logging a drain fault and/or a flood fault. If the pressure sensor output is greater than the second minimum pressure threshold $P2_{MIN}$ for the predetermined time, controller 160 determines at (330) that dishwasher 100 is still experiencing a flood event, and as the drain pump 168 has failed to remove wash fluid from sump 138 and tub 104 below the second minimum pressure threshold $P2_{MIN}$, controller 160 also determines that there is a draining issue. The draining issue can be caused by any number of conditions, including e.g., a clogged drain, a faulty or inoperative drain pump, etc. Accordingly, for this embodiment, at (332) a drain fault and a flood fault are logged. In this way, if dishwasher 100 is serviced, an operator can quickly ascertain the issues affecting dishwasher 100.

Further, in some implementations at (332), the method (300) includes notifying a consumer that dishwasher 100 is experiencing a flood event and that there is a draining issue affecting dishwasher 100. In this way, a consumer can take necessary corrective actions. A consumer may be notified in any of the exemplary ways noted above at (310) and (322).

At (334), if the pressure sensor output is less than or equal to the second minimum pressure threshold $P2_{MIN}$ for the predetermined time, the method (300) includes deactivating the drain pump. Drain pump 168 is deactivated at (334) because, as determined at (330), there is no longer a flood or threat of a flood within dishwasher 100. Moreover, as the controller logic remained in the loop between (324) and (328) for the entire predetermined time threshold $T2_{MAX}$ and then the pressure was determined to be less than or equal to the second minimum pressure threshold $P2_{MIN}$ for the predetermined time at (330), controller 160 determines that dishwasher 100 is experiencing a leak event. Accordingly, at (334) drain pump 168 is deactivated.

In addition, at (334), in some implementations, the method (300) includes logging a leak fault. In this way, if dishwasher 100 is serviced, an operator can quickly ascertain the issues affecting dishwasher 100. Further, in some implementations at (334), the method (300) includes notifying a consumer that there has been a leak event. In this way, a consumer can take necessary corrective actions. A consumer may be notified in any of the exemplary ways noted above at (310) and (322).

At (336), with reference now to FIG. 5C, in some implementations of method (300), after deactivating the drain pump at (314), logging a drain fault at (318), deactivating the drain pump and logging a flood fault at (326), logging a drain and flood fault at (332), or deactivating the drain pump and logging a leak fault at (334), the method (300) includes determining whether a leak fault was logged. If a leak fault was not logged at (334), the controller logic proceeds or returns to (302) to commence the process once again.

At (338), on the other hand, if controller 160 determines at (336) that a leak fault was logged at (334), the controller logic proceeds to (338) to deactivate dishwasher 100. As one example, deactivating dishwasher 100 can include pausing or preventing dishwasher 100 from performing another cycle. If a leak fault is logged at (334), it is assumed that wash fluid is present in leak pan 206. The wash fluid may remain in leak pan 206 for a long time, e.g., until the wash fluid evaporates. Thus, in the meantime, it may be undesirable to continue attempts to drain dishwasher 100 as such attempts would be futile. Accordingly, the leak event experienced by dishwasher 100 does not worsen and an opportunity is presented for a consumer or service operator to address the leak prior to operating dishwasher 100 in another cycle.

At (340), in some implementations, after deactivating dishwasher 100 at (338), the method (300) includes determining whether the dishwasher has been reset. If dishwasher 100 has been reset, controller 160 determines that dishwasher 100 has been cleared to resume normal activity and the controller logic proceeds to (302) and method (300) commences once more. If dishwasher 100 has not been reset, as determined at (340), dishwasher 100 remains deactivated or paused until dishwasher 100 is reset. Dishwasher 100 may be reset in any suitable manner. As one example, dishwasher 100 can include a reset button that may allow a consumer or service operator to manipulate in the event the leak event of dishwasher 100 has been addressed. The reset button may be one of controls 164. As another example, dishwasher 100 may be reset by opening and closing door 116. As yet another example, a consumer may send reset instructions to dishwasher 100 via a text message or other message format.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for detecting a flood event or a leak in a dishwasher appliance, the dishwasher appliance defining a vertical direction and comprising a cabinet and a tub positioned within the cabinet, the tub comprising a tub lip, the dishwasher appliance further comprising a leak pan positioned below the tub along the vertical direction, the dishwasher appliance further comprising a pressure sensor, a tub lip sensor, a leak pan sensor electrically connected to the tub lip sensor in parallel, a circulation pump, and a drain pump, the method comprising:

determining whether the circulation pump is activated;

determining whether a pressure sensor output of the pressure sensor is greater than or equal to a pressure threshold, wherein the pressure threshold that the pressure sensor output is compared to is a first pressure threshold when the circulation pump is not activated and is a second pressure threshold when the circulation pump is activated, the second pressure threshold being different than the first pressure threshold;

determining whether the tub lip sensor has sensed wash fluid at or proximate the tub lip for a predetermined time or whether the leak pan sensor has sensed wash fluid in the leak pan for a predetermined time when the pressure sensor output is not greater than or equal to either the first pressure threshold or the second pressure threshold;

activating the drain pump when the tub lip sensor has sensed wash fluid at or proximate the tub lip for the predetermined time or when the leak pan sensor has sensed wash fluid in the leak pan for the predetermined time;

after activating the drain pump, determining whether the tub lip sensor has sensed wash fluid at or proximate the tub lip for a second predetermined time or whether the leak pan sensor has sensed wash fluid in the leak pan for a second predetermined time;

determining whether a current time is less than or equal to a second predetermined time threshold when the tub lip sensor has sensed wash fluid proximate the tub lip for the second predetermined time or the leak pan sensor has sensed wash fluid in the leak pan for the second predetermined time;

determining whether a second pressure sensor output of the pressure sensor is less than or equal to a second minimum pressure threshold for a predetermined time when the current time is not less than or equal to the second predetermined time threshold;

deactivating the drain pump when the second pressure sensor output is less than or equal to the second minimum pressure threshold for the predetermined time;

logging a leak fault when the second pressure sensor output is less than or equal to the second minimum pressure threshold for the predetermined time, the leak fault indicating that wash fluid has leaked into the leak pan a predetermined distance from a pan lip of the leak pan; and deactivating the dishwasher appliance such that the dishwasher appliance is prevented from operating another cycle in response to the leak fault being logged.

2. The method of claim 1, wherein after determining whether the tub lip sensor has sensed wash fluid at or proximate the tub lip for the predetermined time or whether the leak pan sensor has sensed wash fluid in the leak pan for the predetermined time, the method further comprises:

canceling a current cycle of the dishwasher appliance when the tub lip sensor has sensed wash fluid at or proximate the tub lip for the predetermined time or the leak pan sensor has sensed wash fluid in the leak pan for the predetermined time.

3. The method of claim 2, wherein dishwasher appliance comprises a water inlet valve, and wherein canceling comprises deactivating the water inlet valve of the dishwasher appliance and deactivating the circulation pump.

4. The method of claim 2, wherein, during cancelling, the method further comprises:

notifying a consumer that the current cycle has been canceled.

5. The method of claim 1, wherein after determining whether the tub lip sensor has sensed wash fluid at or proximate the tub lip for the second predetermined time or whether the leak pan sensor has sensed wash fluid in the leak pan for the second predetermined time, the method further comprises:

deactivating the drain pump when the tub lip sensor has not sensed wash fluid proximate the tub lip for the second predetermined and the leak pan sensor has not sensed wash fluid in the leak pan for the second predetermined time.

6. The method of claim 1, wherein after determining whether the second pressure sensor output is less than or equal to the second minimum pressure threshold, the method further comprises:
logging a drain fault and a flood fault when the second pressure sensor output is not less than or equal to the second minimum pressure threshold for the predetermined time.

7. The method of claim 1, wherein during determining whether the tub lip sensor has sensed wash fluid at or proximate the tub lip for the predetermined time or whether the leak pan sensor has sensed wash fluid in the leak pan for the predetermined time when the pressure sensor output is not greater than or equal to either the first pressure threshold or the second pressure threshold, the tub lip sensor must sense wash fluid at or proximate the tub lip consecutively for the predetermined time or the leak pan sensor must sense wash fluid in the leak pan consecutively for the predetermined time.

8. The method of claim 1, wherein after deactivating the dishwasher appliance such that the dishwasher appliance is prevented from operating another cycle in response to the leak fault being logged, the method further comprises:
determining whether the dishwasher appliance has been reset, and
wherein when the dishwasher appliance has been reset, the dishwasher appliance is operable to resume normal operation.

9. The method of claim 1, wherein the leak pan sensor is mounted to the pan lip of the leak pan.

10. A dishwasher appliance defining a vertical direction, the dishwasher appliance comprising:
a cabinet;
a tub positioned within the cabinet and defining a wash chamber for receipt of articles for washing, the tub comprising a tub lip;
a tub lip sensor positioned on or proximate the tub lip and configured to detect wash fluid at or proximate the tub lip;
a circulation pump for circulating wash fluid throughout the dishwasher appliance;
a sump;
a pressure sensor mounted to the sump;
a leak pan positioned below the sump along the vertical direction;
a leak pan sensor positioned on or proximate the leak pan and configured to detect wash fluid in the leak pan, wherein the leak pan sensor and the tub lip sensor are electrically connected in parallel;
a drain pump for draining wash fluid from the dishwasher appliance; and
a controller communicatively coupled with the pressure sensor, the tub lip sensor, the leak pan sensor, the circulation pump, and the drain pump, the controller configured to:
determine whether the circulation pump is activated;
determine whether a pressure sensor output of the pressure sensor is greater than or equal to a pressure threshold, wherein the pressure threshold that the pressure sensor output is compared to is a first pressure threshold when the circulation pump is not activated and is a second pressure threshold when the circulation pump is activated, the second pressure threshold being different than the first pressure threshold;
determine whether the tub lip sensor has sensed wash fluid at or proximate the tub lip for a predetermined time or whether the leak pan sensor has sensed wash fluid in the leak pan for a predetermined time when the pressure sensor output is not greater than or equal to either the first pressure threshold or the second pressure threshold; and
activate the drain pump when the tub lip sensor has sensed wash fluid at or proximate the tub lip for the predetermined time or when the leak pan sensor has sensed wash fluid in the leak pan for the predetermined time;
after activating the drain pump, determine whether the tub lip sensor has sensed wash fluid at or proximate the tub lip for a second predetermined time or whether the leak pan sensor has sensed wash fluid in the leak pan for a second predetermined time;
determine whether a current time is less than or equal to a second predetermined time threshold when the tub lip sensor has sensed wash fluid proximate the tub lip for the second predetermined time or the leak pan sensor has sensed wash fluid in the leak pan for the second predetermined time;
determine whether a second pressure sensor output of the pressure sensor is less than or equal to a second minimum pressure threshold for a predetermined time when the current time is not less than or equal to the second predetermined time threshold;
deactivate the drain pump when the second pressure sensor output is less than or equal to the second minimum pressure threshold for the predetermined time;
log a leak fault when the second pressure sensor output is less than or equal to the second minimum pressure threshold for the predetermined time, the leak fault indicating that wash fluid has leaked into the leak pan a predetermined distance from a pan lip of the leak pan; and
deactivate the dishwasher appliance such that the dishwasher appliance is prevented from operating another cycle in response to the leak fault being logged.

11. The dishwasher appliance of claim 10, wherein after the controller determines whether the tub lip sensor has sensed wash fluid at or proximate the tub lip for the predetermined time or whether the leak pan sensor has sensed wash fluid in the leak pan for the predetermined time, the controller is further configured to:
cancel a current cycle of the dishwasher appliance when the tub lip sensor has sensed wash fluid at or proximate the tub lip for the predetermined time or the leak pan sensor has sensed wash fluid in the leak pan for the predetermined time.

12. The dishwasher appliance of claim 11, further comprising:
an inlet water valve communicatively coupled with the controller;
wherein when the controller cancels the current cycle, the controller is configured to:
deactivate the inlet water valve; and
deactivate the circulation pump.

13. The dishwasher appliance of claim 10, wherein after the controller activates the drain pump, the controller is further configured to:

deactivate the drain pump when the tub lip sensor has not sensed wash fluid at or proximate the tub lip for the second predetermined time or when the leak pan sensor has not sensed wash fluid in the leak pan for the second predetermined time.

14. The dishwasher appliance of claim 10, further comprising:
a communication interface communicatively coupled with the controller, and wherein when the controller activates the drain pump, the communication interface is configured to:
communicate a notification that a flood event has occurred.

15. The dishwasher appliance of claim 10,
wherein after the controller determines whether the second pressure sensor output is less than or equal to the second minimum pressure threshold for the predetermined time, the controller is further configured to:
log a drain fault and a flood fault when the pressure sensor output is not less than or equal to the second minimum pressure threshold for the predetermined time.

16. The dishwasher appliance of claim 10, wherein after the controller deactivates the dishwasher appliance such that the dishwasher appliance is prevented from operating another cycle in response to the leak fault being logged, the controller is further configured to:
determine whether the dishwasher appliance has been reset, and
wherein when the dishwasher appliance has been reset, the dishwasher appliance is operable to resume normal operation.

17. The dishwasher appliance of claim 10, wherein the leak pan sensor is mounted to the pan lip of the leak pan.

18. The dishwasher appliance of claim 10, wherein the first pressure sensor output and the second pressure sensor output indicate a height of wash fluid above the pressure sensor along the vertical direction.

19. The dishwasher appliance of claim 10, wherein the pressure sensor is mounted to an outer wall of the sump and is in fluid communication with the sump.

* * * * *